(12) United States Patent
Kawaoka

(10) Patent No.: US 9,154,652 B2
(45) Date of Patent: Oct. 6, 2015

(54) DISPLAY INPUT DEVICE, AND IMAGE FORMING APPARATUS INCLUDING DISPLAY PORTION

(71) Applicant: KYOCERA Document Solutions Inc., Osaka-shi, Osaka (JP)

(72) Inventor: Ryo Kawaoka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/011,644

(22) Filed: Aug. 27, 2013

(65) Prior Publication Data

US 2014/0063525 A1 Mar. 6, 2014

(30) Foreign Application Priority Data

Aug. 31, 2012 (JP) ................................. 2012-190898

(51) Int. Cl.
| | |
|---|---|
| *G06F 3/12* | (2006.01) |
| *H04N 1/00* | (2006.01) |
| *G06F 3/01* | (2006.01) |
| *G06F 3/041* | (2006.01) |
| *G06F 3/043* | (2006.01) |

(52) U.S. Cl.
CPC ............ *H04N 1/00392* (2013.01); *G06F 3/016* (2013.01); *G06F 3/041* (2013.01); *G06F 3/043* (2013.01); *G06F 2203/04105* (2013.01)

(58) Field of Classification Search
CPC ......... G06F 3/016; G06F 3/043; G06F 3/041; G06F 3/0414; H04N 1/00392; G09G 3/3466
See application file for complete search history.

(56) References Cited

U.S. PATENT DOCUMENTS

| 2004/0021663 A1* | 2/2004 | Suzuki et al. ................. 345/419 |
| 2008/0216578 A1* | 9/2008 | Takashima et al. ............. 73/658 |
| 2009/0079698 A1* | 3/2009 | Takashima et al. ........... 345/169 |

(Continued)

FOREIGN PATENT DOCUMENTS

| EP | 2144144 A | 5/2009 |
| EP | 2270627 A1 | 1/2011 |

(Continued)

OTHER PUBLICATIONS

European Patent Office, Extended European Search Report Issued in Application No. 13182186.0, Jun. 25, 2015, Germany, 9 pages.

*Primary Examiner* — Ted Barnes
(74) *Attorney, Agent, or Firm* — Alleman Hall McCoy Russell & Tuttle LLP

(57) ABSTRACT

A display input device according to one aspect of the present disclosure includes display portion, piezoelectric element, drive portion, and detection portion. The display portion includes touch panel that detects touched position on display surface. The piezoelectric element is provided on touch panel and vibrates touch panel. In response to touch panel being touched, drive portion applies a voltage to piezoelectric element to vibrate piezoelectric element. The detection portion detects the voltage value of a voltage generated in piezoelectric element by a pressure being applied to piezoelectric element when touch panel is touched. The smaller the voltage value detected by detection portion is, the larger the voltage applied to piezoelectric element by drive portion for vibrating piezoelectric element is. The larger the voltage value detected by detection portion is, the smaller the voltage applied to piezoelectric element by drive portion for vibrating piezoelectric element is.

4 Claims, 6 Drawing Sheets

(56) References Cited

U.S. PATENT DOCUMENTS

| | | |
|---|---|---|
| 2009/0135150 A1* | 5/2009 | Takashima et al. ............ 345/173 |
| 2009/0140996 A1* | 6/2009 | Takashima et al. ............ 345/173 |
| 2009/0160813 A1* | 6/2009 | Takashima et al. ............ 345/173 |
| 2009/0242282 A1* | 10/2009 | Kim et al. .................. 178/18.03 |
| 2010/0123588 A1* | 5/2010 | Cruz Hernandez ........ 340/573.1 |
| 2010/0182282 A1* | 7/2010 | Kurokawa et al. ............ 345/175 |
| 2010/0328053 A1* | 12/2010 | Yeh et al. .................... 340/407.2 |
| 2011/0248930 A1* | 10/2011 | Kwok et al. ................... 345/173 |
| 2012/0001749 A1* | 1/2012 | Cruz-Hernandez ........... 340/522 |
| 2012/0126962 A1* | 5/2012 | Ujii et al. .................... 340/407.2 |
| 2012/0154317 A1 | 6/2012 | Aono |
| 2012/0162693 A1* | 6/2012 | Ito ............................... 358/1.14 |
| 2012/0194483 A1* | 8/2012 | Deluca ........................... 345/177 |
| 2012/0212434 A1* | 8/2012 | Bluemler et al. ............. 345/173 |
| 2012/0223880 A1* | 9/2012 | Birnbaum et al. ............ 345/156 |
| 2013/0106589 A1* | 5/2013 | Posamentier ............... 340/407.1 |
| 2013/0120306 A1* | 5/2013 | Furukawa .................... 345/173 |
| 2013/0222126 A1* | 8/2013 | Aono .......................... 340/407.2 |
| 2014/0092064 A1* | 4/2014 | Bernstein et al. ............. 345/174 |
| 2014/0168115 A1* | 6/2014 | Takashima et al. ........... 345/173 |
| 2014/0306904 A1* | 10/2014 | Modarres et al. ............. 345/173 |

FOREIGN PATENT DOCUMENTS

| | | | |
|---|---|---|---|
| EP | 2472369 A1 | 7/2012 | |
| JP | 2010020519 A | 1/2010 | |
| JP | WO2012063497 A1 * | 5/2012 | ............... G06F 3/01 |
| KR | 20100066676 * | 6/2010 | |

* cited by examiner

F I G. 7
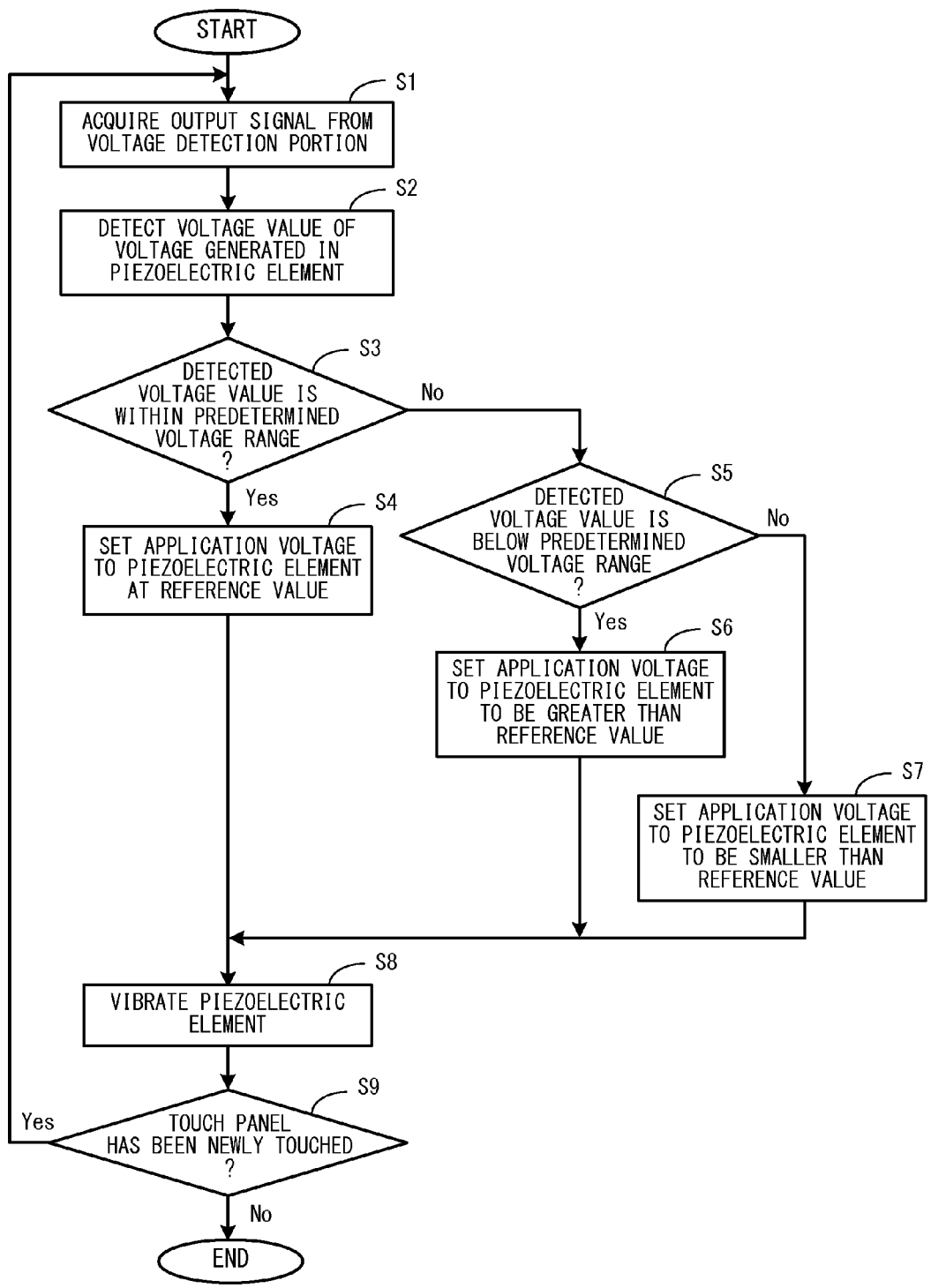

DISPLAY INPUT DEVICE, AND IMAGE FORMING APPARATUS INCLUDING DISPLAY PORTION

INCORPORATION BY REFERENCE

This application is based upon and claims the benefit of priority from the corresponding Japanese Patent Application No. 2012-190898 filed on Aug. 31, 2012, the entire contents of which are incorporated herein by reference.

BACKGROUND

The present disclosure relates to a display input device, and an image forming apparatus including a display portion.

An image forming apparatus has a plurality of setting items for which the setting values can be changed upon execution of a job. Therefore, a general image forming apparatus includes a display input device for accepting an instruction to change each setting value.

The display input device of the image forming apparatus may include, as well as a hardware key, a display portion with a touch panel on which a software key, a menu, and the like are displayed. Such a display input device displays, on the display portion, a software key, a menu, and the like for accepting various settings, and detects a touched position (software key) touched via the touch panel, based on output of the touch panel.

However, in the case where various settings are accepted through a touching operation on the touch panel, a user cannot obtain a feeling (click feeling) as obtained when pressing the hardware key. Therefore, the user cannot instantaneously determine whether or not a touching operation performed on the touch panel has been definitely accepted, and thus the usability is poor.

A display input device that provides a click feeling to a user when the user touches a touch panel, is known. The display input device vibrates the touch panel in response to the touch panel being touched by a user. Specifically, a piezoelectric element is provided on the touch panel, so that the piezoelectric element is vibrated when a user touches the touch panel. As a result, the touch panel is vibrated.

Normally, in the known display input device, in order to prevent the piezoelectric element from being visible through the display screen, the piezoelectric element is provided at only a certain part (a part outside the valid display area) of the touch panel. Therefore, when a user touches the touch panel, the touched position may be a position near the providing position of the piezoelectric element or may be a position far from the providing position of piezoelectric element.

In this case, if the touched position is a position near the providing position of the piezoelectric element, vibration of the piezoelectric element is well transmitted to a finger of the user. However, if the touched position is a position far from the providing position of the piezoelectric element, vibration of the piezoelectric element is less transmitted to a finger of the user. That is, a click feeling (feeling of vibration caused by the piezoelectric element) provided when a user touches the touch panel is strengthened as the touched position comes close to the providing position of the piezoelectric element, and weakened as the touched position becomes away from the providing position of the piezoelectric element. Therefore, when a user touches the touch panel, the click feeling provided to a user varies depending on the touched position.

SUMMARY

A display input device according to one aspect of the present disclosure includes a display portion, a piezoelectric element, a drive portion, and a detection portion. The display portion includes a touch panel that detects a touched position on a display surface. The piezoelectric element is provided on the touch panel and vibrates the touch panel. In response to the touch panel being touched, the drive portion applies a voltage to the piezoelectric element to vibrate the piezoelectric element. The detection portion detects the voltage value of a voltage generated in the piezoelectric element by a pressure being applied to the piezoelectric element when the touch panel is touched. The smaller the voltage value detected by the detection portion is, the larger the voltage applied to the piezoelectric element by the drive portion for vibrating the piezoelectric element is. The larger the voltage value detected by the detection portion is, the smaller the voltage applied to the piezoelectric element by the drive portion for vibrating the piezoelectric element is.

An image forming apparatus according to another aspect of the present disclosure includes a display portion, a piezoelectric element, a drive portion, and a detection portion. The display portion includes a touch panel that detects a touched position on a display surface. The piezoelectric element is provided on the touch panel and vibrates the touch panel. In response to the touch panel being touched, the drive portion applies a voltage to the piezoelectric element to vibrate the piezoelectric element. The detection portion detects the voltage value of a voltage generated in the piezoelectric element by a pressure being applied to the piezoelectric element when the touch panel is touched. The smaller the voltage value detected by the detection portion is, the larger the voltage applied to the piezoelectric element by the drive portion for vibrating the piezoelectric element is. The larger the voltage value detected by the detection portion is, the smaller the voltage applied to the piezoelectric element by the drive portion for vibrating the piezoelectric element is.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a flowchart for explaining an operation to provide a click feeling to a user performing a touching operation on the touch panel of the display input device shown in FIG. 2.

DETAILED DESCRIPTION

Hereinafter, as an example of an image forming apparatus including a display input device according to one embodiment of the present disclosure, an image forming apparatus (multifunction peripheral) capable of executing a plurality of jobs such as copy, scanning, and facsimile will be described.

(Entire Configuration of Image Forming Apparatus)

Figure 1:
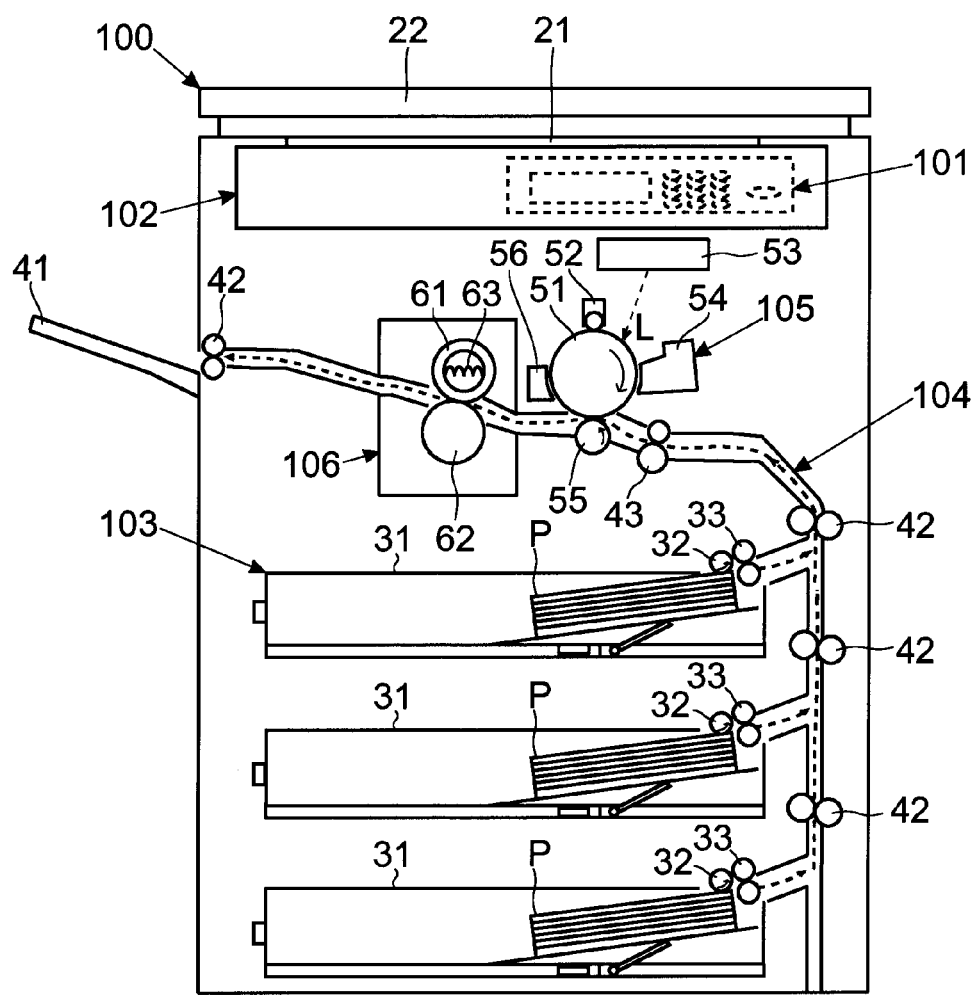
FIG. 1 is a schematic diagram of an image forming apparatus including a display input device according to one embodiment of the present disclosure.

As shown in FIG. 1, an image forming apparatus 100 of the present embodiment includes an operation panel 101 (corresponding to "display input device" described in claims), an image reading portion 102, a sheet feed portion 103, a paper sheet conveying portion 104, an image forming portion 105, and a fixing portion 106.

Figure 2:
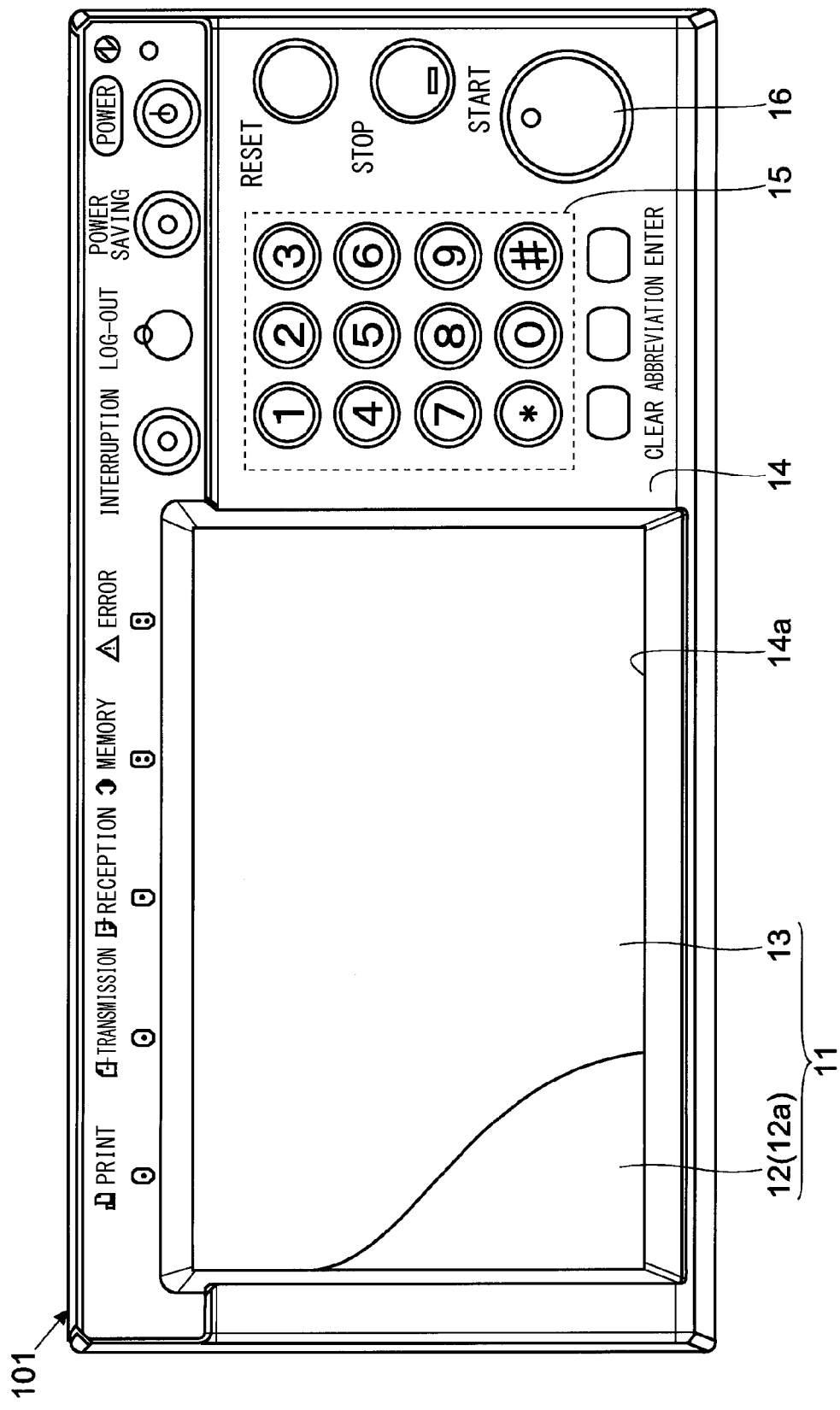
FIG. 2 is a detailed diagram of the display input device of the image forming apparatus shown in FIG. 1.

As shown in FIG. 2, the operation panel 101 includes a liquid crystal display portion 11 (corresponding to "display portion" described in claims). The liquid crystal display portion 11 includes a liquid crystal display panel 12 and a touch panel 13, and a display surface 12a of the liquid crystal display panel 12 is covered by the touch panel 13. The liquid crystal display panel 12 displays a software key or a menu for accepting various settings, on the display surface 12a. The touch panel 13 is provided for detecting a touched position on the display surface 12a of the liquid crystal display panel 12.

In addition, the liquid crystal display portion 11 (the liquid crystal display panel 12 and the touch panel 13) is held by a housing case 14 forming an outer framework of the operation panel 101. The housing case 14 has an opening 14a formed thereon. In the state in which the liquid crystal display portion 11 is held by the housing case 14, a valid display area of the liquid crystal display panel 12 is exposed from the opening 14a of the housing case 14.

It is noted that the operation panel 101 also has, as hardware keys, a numeric keypad 15 for accepting a numeric input, a start key 16 for accepting an instruction to execute a job, and the like.

As shown in FIG. 1, the image reading portion 102 reads a document sheet and generates image data of an image to be formed. In the image reading portion 102, optically-relevant members such as an exposure lamp, a mirror, a lens, and an image sensor are provided though not shown. The image reading portion 102 radiates light onto a document sheet placed on the contact glass 21. Then, the image reading portion 102 performs A/D conversion for an output value of the image sensor receiving light reflected from the document sheet, thereby generating image data. Thus, the image forming apparatus 100 can perform printing based on the image data obtained by the reading operation (scanning) of the document sheet performed by the image reading portion 102. In addition, the image forming apparatus 100 can also store the image data obtained by the scanning. It is noted that in the image reading portion 102, a document sheet holding portion 22 that holds a document sheet placed on the contact glass 21 is provided.

The sheet feed portion 103 includes a cassette 31 that contains a paper sheet P, and feeds a paper sheet P in the cassette 31 to a paper sheet conveyance path. In addition, the sheet feed portion 103 includes a pick-up roller 32, a separating roller pair 33, and the like for feeding one by one a paper sheet P in the cassette 31 to the paper sheet conveyance path. The pick-up roller 32 takes out a paper sheet P from the cassette 31. The separating roller pair 33 prevents multi feed of the paper sheet P.

The paper sheet conveying portion 104 conveys a paper sheet P fed to the paper sheet conveyance path, along the paper sheet conveyance path (toward a discharge tray 41). The paper sheet conveying portion 104 includes a plurality of conveying roller pairs 42 rotatably provided on the paper sheet conveyance path. In addition, the paper sheet conveying portion 104 includes a registration roller pair 43 provided at a position on the upstream side in the paper sheet conveyance direction of the image forming portion 105 (at a position just before reaching the image forming portion 105). The registration roller pair 43 causes a paper sheet P to stand by just before the image forming portion 105, and conveys the paper sheet P to the image forming portion 105 at an appropriate timing.

The image forming portion 105 forms a toner image based on image data of an image to be formed, and transfers the toner image onto the paper sheet P. The image forming portion 105 includes a photosensitive drum 51, a charging device 52, an exposure device 53, a developing device 54, a transfer roller 55, and a cleaning device 56.

Upon image formation, first, the photosensitive drum 51 is rotationally driven and the charging device 52 charges the surface of the photosensitive drum 51 at a predetermined potential. In addition, the exposure device 53 outputs a light beam L based on image data of an image to be formed, thereby scanning and exposing the surface of the photosensitive drum 51 with the light beam L. Thus, an electrostatic latent image is formed on the surface of the photosensitive drum 51. The developing device 54 supplies toner to the electrostatic latent image formed on the surface of the photosensitive drum 51, thereby developing the image.

The transfer roller 55 can be rotated while pressing the surface of the photosensitive drum 51. The registration roller pair 43 causes a paper sheet P to proceed between the transfer roller 55 and the photosensitive drum 51 at an appropriate timing. At this time, a transfer voltage is applied to the transfer roller 55. Thus, a toner image on the surface of the photosensitive drum 51 is transferred onto the paper sheet P. Thereafter, the cleaning apparatus 56 eliminates residual toner and the like on the surface of the photosensitive drum 51.

The fixing portion 106 heats and pressurizes a toner image transferred onto a paper sheet P, thereby fixing the toner image. The fixing portion 106 includes a heating roller 61 and a pressure roller 62. The heating roller 61 includes a heater 63. The pressure roller 62 is pressed to the heating roller 61. The paper sheet P having the toner image transferred thereon passes between the heating roller 61 and the pressure roller 62, whereby the paper sheet P is heated and pressed. Thus, the toner image is fixed on the paper sheet P, whereby the printing is completed. Thereafter, the printed paper sheet P is conveyed to the discharge tray 41 by the conveying roller pair 42.

(Hardware Configuration of Image Forming Apparatus)

Figure 3:
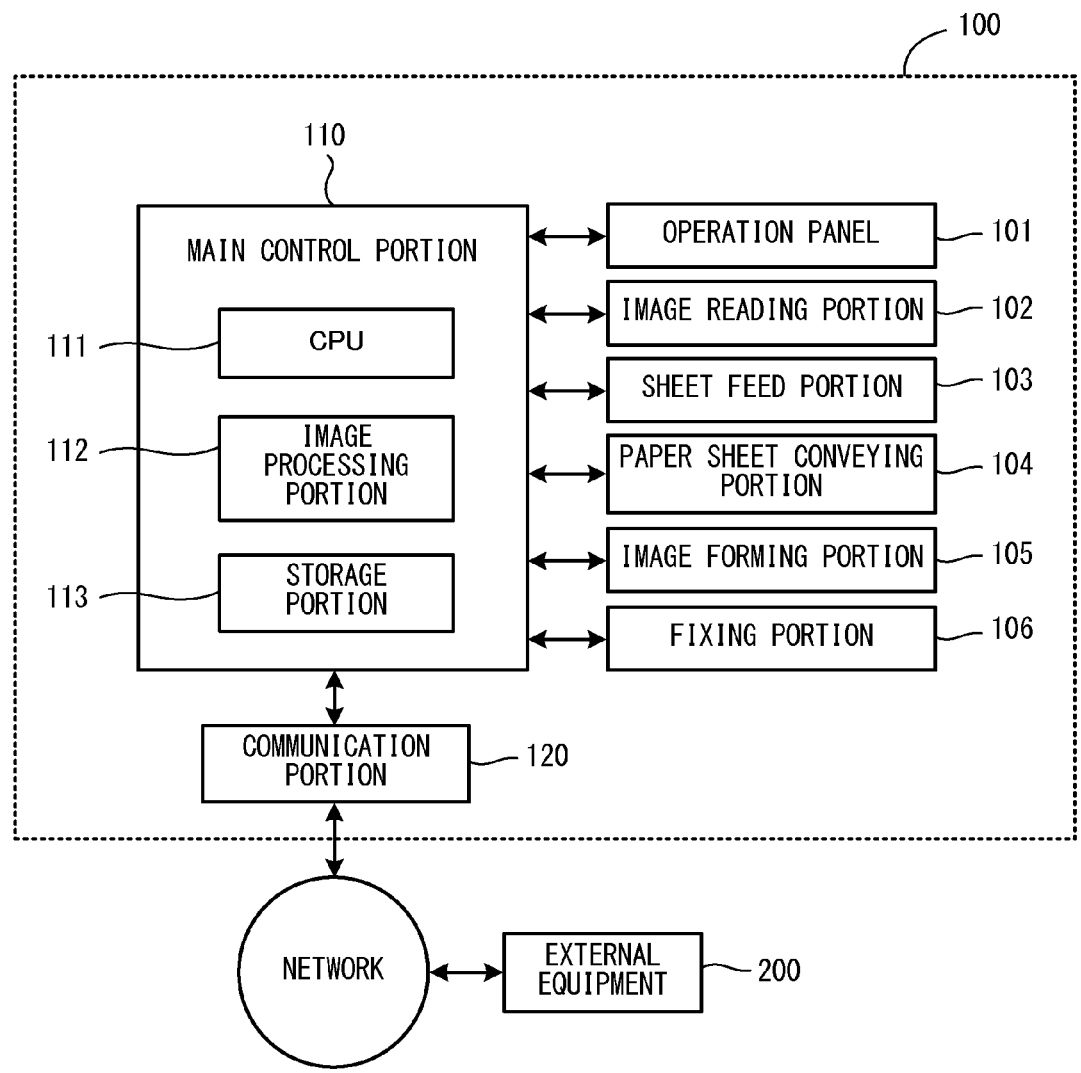
FIG. 3 is a block diagram for explaining the hardware configuration of the image forming apparatus shown in FIG. 1.

As shown in FIG. 3, the image forming apparatus 100 includes a main control portion 110 that controls the entire apparatus. The main control portion 110 includes a CPU 111, an image processing portion 112, and a storage portion 113. The image processing portion 112 includes a dedicated ASIC for image processing, a memory, and the like, and performs various image processes (such as expansion/reduction, density conversion, and data form conversion) for image data. The storage portion 113 includes a ROM, a RAM, an HDD, and the like. For example, a program and data needed for executing a job are stored in the ROM, and the program and the data are expanded on the RAM.

The image reading portion 102, the sheet feed portion 103, the paper sheet conveying portion 104, the image forming portion 105, and the fixing portion 106 are connected to the main control portion 110, and each operate based on an instruction from the main control portion 110. Further, the main control portion 110 is connected to a communication portion 120, and controls communication performed with external equipment 200 (for example, a personal computer, a server, a facsimile, and the like).

Figure 4:
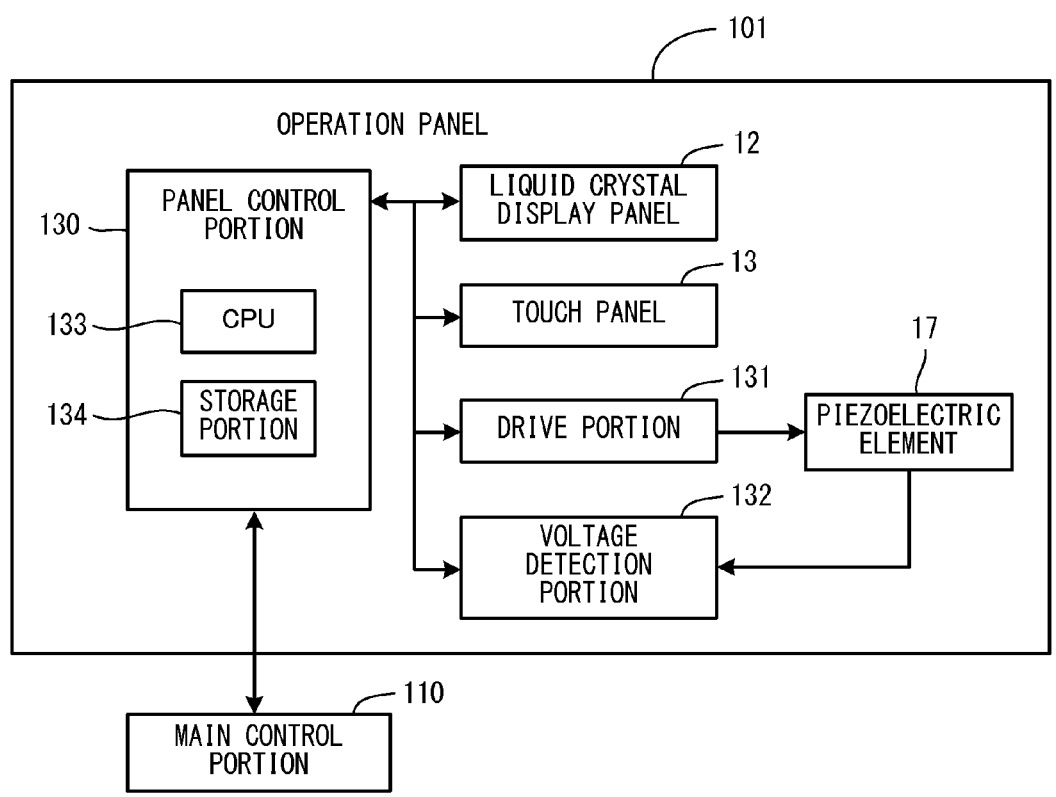
FIG. 4 is a block diagram for explaining the hardware configuration of the display input device shown in FIG. 2.

As shown in FIG. 4, the operation panel 101 includes a panel control portion 130 connected to the main control portion 110. The panel control portion 130 includes a CPU 133 and a storage portion 134. In response to an instruction from the main control portion 110, the panel control portion 130 controls a display operation of the operation panel 101. For example, the panel control portion 130 causes the liquid crystal display panel 12 to display a software key and a menu for accepting various settings, and when a touching operation of touching the touch panel 13 is performed, detects the coordinates of the touched position based on the output of the touch panel 13. It is noted that data indicating the correspondence between the output of the touch panel 13 and the coordinates of the touched position is stored in the storage portion 134.

(Provision of Click Feeling Upon Touching Operation)

When the operation panel 101 has accepted a touching operation from a user, the operation panel 101 vibrates the touch panel 13 in order to provide a feeling (click feeling) as obtained when pressing the hardware key, to a user. Specifically, the piezoelectric element 17 that vibrates the touch panel 13 is provided on the touch panel 13. For example, the piezoelectric element 17 is provided between the liquid crystal display panel 12 and the touch panel 13. A drive portion 131 that drives the piezoelectric element 17 applies a voltage to the piezoelectric element 17 to vibrate the piezoelectric element 17 when the panel control portion 130 has detected a touch on the touch panel 13. Thus, when a user touches the touch panel 13, the touch panel 13 provided with the piezoelectric element 17 is also vibrated, whereby the user can obtain a click feeling.

The piezoelectric element 17 is formed by interposing a piezoelectric body made of a piezoelectric ceramic such as PZT (lead zirconate titanate) between a pair of electrodes. The piezoelectric element 17 thus formed is displaced (warps) in accordance with an application voltage. For example, after the piezoelectric element 17 warps by a predetermined voltage being applied thereto, the warp reduces as the application voltage is reduced, and the piezoelectric element 17 returns to its original shape when the application of voltage is stopped. Therefore, for vibrating the piezoelectric element 17, the drive portion 131 periodically changes the application voltage to the piezoelectric element 17 (changes the waveform of the application voltage to the piezoelectric element 17 to a rectangular wave, a sine wave, a saw-tooth wave, a triangular wave, or the like). Thus, the piezoelectric element 17 is vibrated and the touch panel 13 provided with the piezoelectric element 17 is also vibrated.

Figure 5:
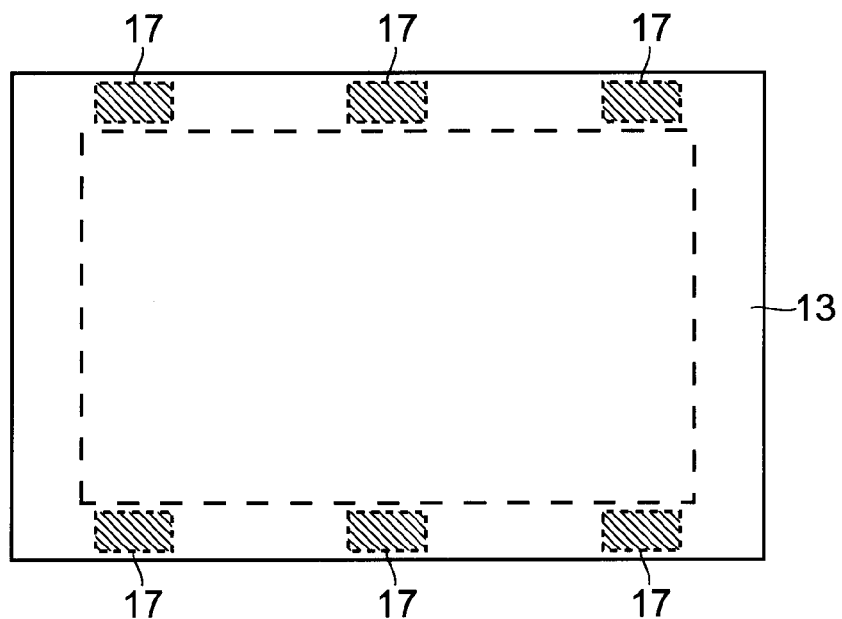
FIG. 5 is a diagram for explaining the providing position of a piezoelectric element provided on a touch panel of the display input device shown in FIG. 2.

In addition, as shown in FIG. 5, a plurality of the piezoelectric elements 17 are provided on the touch panel 13 (between the liquid crystal display panel 12 and the touch panel 13). As an example, FIG. 5 shows the case where six piezoelectric elements 17 are provided on the touch panel 13. It is noted that the providing number of the piezoelectric elements 17 is not specifically limited. The providing number may be one to five or may be seven or more.

As an example of the plurality of piezoelectric elements 17, in a plane view, three piezoelectric elements 17 are provided on each of a pair of sides (in FIG. 5, the upper side and the lower side) parallel with each other on the touch panel 13. In addition, the plurality of piezoelectric elements 17 are positioned in an area outside a valid display area (area surrounded by a dashed line) so that the piezoelectric elements 17 are invisible through the screen.

(Correction of Application Voltage to Piezoelectric Element)

A click feeling (feeling of vibration caused by the piezoelectric element 17) provided when a user touches the touch panel 13 is strengthened as the touched position comes close to the providing position of the piezoelectric element 17, and weakened as the touched position becomes away from the providing position of the piezoelectric element 17. In addition, when a user strongly touches the touch panel 13, vibration is well transmitted to a finger and therefore a click feeling is strengthened, and when a user weakly touches the touch panel 13, vibration is less transmitted to a finger and therefore a click feeling is weakened.

It is noted that in the structure in which the plurality of piezoelectric elements 17 are provided on the touch panel 13, there may be variations in the attachment accuracies of the plurality of piezoelectric elements 17 on the touch panel 13. In this case, a click feeling provided to a user varies between when the user touches the vicinity of the providing position of the piezoelectric element 17 with a low attachment accuracy (for example, the piezoelectric element 17 with a gap formed between the piezoelectric element 17 and the touch panel 13) and when the user touches the vicinity of the providing position of the piezoelectric element 17 with a high attachment accuracy, even if both touched positions are in the vicinity of the providing position of the piezoelectric element 17. That is, when a user touches the vicinity of the providing position of the piezoelectric element 17 with a low attachment accuracy, a click feeling provided to the user is weaker than when a user touches the vicinity of the providing position of the piezoelectric element 17 with a high attachment accuracy (vibration caused by the piezoelectric element 17 is less transmitted to a finger because of a gap formed between the piezoelectric element 17 and the touch panel 13).

Figure 6:
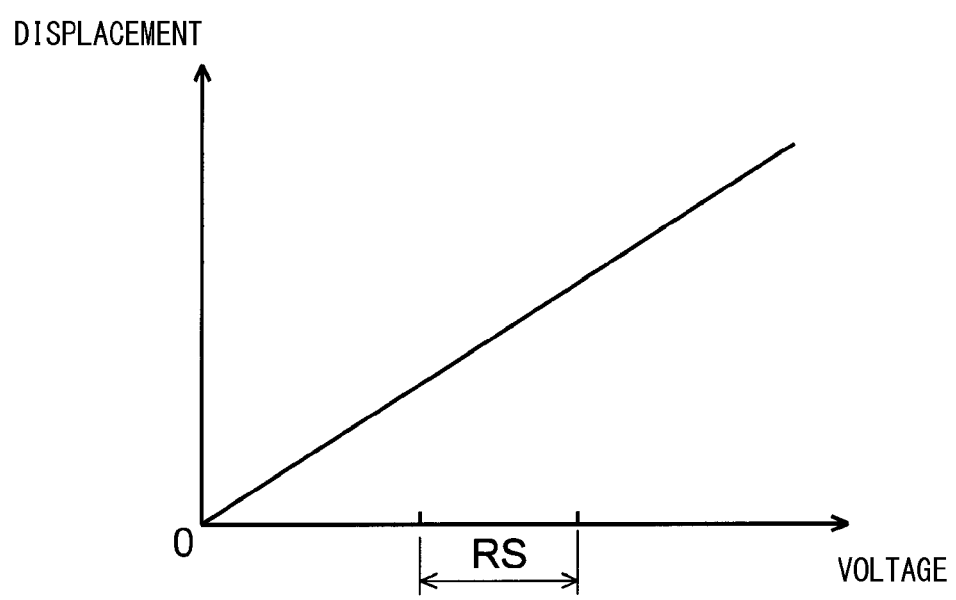
FIG. 6 is a graph for explaining the characteristic of the piezoelectric element provided on the touch panel of the display input device shown in FIG. 2.

Here, when the touch panel 13 is touched by a user, a pressure is applied to the piezoelectric element 17, whereby the piezoelectric element 17 is displaced. At this time, electric charge is generated in the piezoelectric element 17. That is, a voltage is generated in the piezoelectric element 17. As shown in FIG. 6, the voltage generated in the piezoelectric element 17 increases as the displacement of the piezoelectric element 17 increases. Therefore, when the touch panel 13 is touched by a user, the closer to the providing position of the piezoelectric element 17 the touched position is or the larger the pressing force upon the touching is, the larger the pressure applied to the piezoelectric element 17 (the displacement of the piezoelectric element 17) is and the larger the voltage generated in the piezoelectric element 17 is. In addition, the higher the attachment accuracy of the piezoelectric element 17 is, the larger the pressure applied to the piezoelectric element 17 (the displacement of the piezoelectric element 17) is and the larger the voltage generated in the piezoelectric element 17 is.

Accordingly, in the present embodiment, in order to reduce variation in a click feeling provided when a user touches the touch panel 13, the application voltage to the piezoelectric element 17 for vibrating the piezoelectric element 17 is changed in accordance with a voltage generated in the piezoelectric element 17 when a user touches the touch panel 13 (a drive voltage for driving the piezoelectric element 17 is not fixed).

For example, as shown in FIG. 4, a voltage detection portion 132 that detects the voltage value of a voltage generated in the piezoelectric element 17 is connected to the piezoelectric element 17. When a user touches the touch panel 13, the voltage detection portion 132 converts electric charge generated in the piezoelectric element 17 into a voltage, amplifies the voltage, and outputs the amplified voltage to panel control portion 130. By receiving the output signal from the voltage detection portion 132, the panel control portion 130 detects the voltage value (the maximum value of amplitude) of the voltage generated in the piezoelectric element 17 when the user has touched touch panel 13. It is noted that in this configuration, the panel control portion 130 connected to the voltage detection portion 132 corresponds to a "detection portion" described in claims.

The smaller the voltage value detected when the user has touched the touch panel 13 is, the larger the panel control portion 130 makes the application voltage to the piezoelectric element 17 for vibrating the piezoelectric element 17. That is, the drive portion 131 increases the amplitude (maximum voltage value) of a voltage to be applied to the piezoelectric element 17 for vibrating the piezoelectric element 17. On the other hand, the larger the voltage value detected when the user has touched the touch panel 13 is, the smaller the panel control portion 130 makes the application voltage to the piezoelectric element 17 for vibrating the piezoelectric element 17. That is, the drive portion 131 decreases the amplitude (maximum voltage value) of a voltage to be applied to the piezoelectric element 17 for vibrating the piezoelectric element 17.

Thus, when a user touches the touch panel 13, if vibration caused by the piezoelectric element 17 is well transmitted to a finger of the user, the vibration of the piezoelectric element 17 becomes small, and if vibration caused by the piezoelectric element 17 is less transmitted to a finger of the user, the vibration of the piezoelectric element 17 becomes large. As a result, variation in a click feeling (feeling of vibration caused by the piezoelectric element 17) provided to a user can be suppressed.

For example, if the voltage value detected by the panel control portion 130 is within a voltage range RS shown in FIG. 6, the drive portion 131 keeps the amplitude (maximum voltage value) of a voltage to be applied to the piezoelectric element 17 at a predetermined reference value. If the voltage value detected by the panel control portion 130 is below the voltage range RS, the drive portion 131 increases the amplitude (maximum voltage value) of a voltage to be applied to the piezoelectric element 17, to be larger than the reference value. On the other hand, if the voltage value detected by the panel control portion 130 is above the voltage range RS, the drive portion 131 decreases the amplitude (maximum voltage value) of a voltage to be applied to the piezoelectric element 17, to be smaller than the reference value.

As a result, for example, when a user touches the touch panel 13, the closer to the touched position the piezoelectric element 17 is, the smaller the voltage supplied to the piezoelectric element 17 is (the smaller the vibration of the piezoelectric element 17 is). On the other hand, the farther from the touched position the piezoelectric element 17 is, the larger the voltage supplied to the piezoelectric element 17 is (the larger the vibration of the piezoelectric element 17 is). If the voltage value detected by the panel control portion 130 is within the predetermined voltage range RS, the voltage to be applied to the piezoelectric element 17 is kept at the reference value.

It is noted that, for example, even if the piezoelectric element 17 is close to the touched position, if the pressing force upon the touching is small, the piezoelectric element 17 is not displaced so much. Therefore, the voltage value detected by the panel control portion 130 (voltage generated in the piezoelectric element 17) can be below the voltage range RS. In addition, if the touched position is near the piezoelectric element 17 with a low attachment accuracy, similarly, the voltage value detected by the panel control portion 130 (voltage generated in the piezoelectric element 17) can be below the voltage range RS. In such a case, even though the piezoelectric element 17 is close to the touched position, the voltage supplied to the piezoelectric element 17 becomes large (the vibration of the piezoelectric element 17 becomes large). That is, in the present embodiment, the application voltage to the piezoelectric element 17 for vibrating the piezoelectric element 17 varies depending on the touched position, the pressing force upon the touching, the attachment accuracy of the piezoelectric element 17, and the like.

As shown in FIG. 5, a plurality of piezoelectric elements 17 may be provided on the touch panel 13. In this case, when the touch panel 13 is touched, the panel control portion 130 receives an output signal from the voltage detection portion 132 and thereby detects all the voltage values of voltages generated in the plurality of piezoelectric elements 17. Then, the drive portion 131 adjusts the application voltages to the plurality of piezoelectric elements 17 individually in accordance with the voltage values of voltages generated in the plurality of piezoelectric elements 17. At this time, the drive portion 131 increases the application voltage to the piezoelectric element 17 whose voltage value detected by the panel control portion 130 is below the voltage range RS, among the plurality of piezoelectric elements 17, to be larger than the reference value. Meanwhile, the drive portion 131 decreases the application voltage to the piezoelectric element 17 whose voltage value detected by the panel control portion 130 is above the voltage range RS, to be smaller than the reference value.

Thus, it is possible to increase the vibration of the piezoelectric element 17 whose voltage value detected by the panel control portion 130 is below the predetermined voltage range RS, among the plurality of piezoelectric elements 17, and decrease the vibration of the piezoelectric element 17 whose voltage value detected by the panel control portion 130 is above the predetermined voltage range RS.

In addition, a touched position or a pressing force upon touching differs depending on each touching operation on the touch panel 13. Therefore, the drive portion 131 adjusts the application voltage to the piezoelectric element 17 based on the voltage value detected by the panel control portion 130, every time the touch panel 13 is touched. Thus, even if a user successively touches the touch panel 13 several times, variation in a click feeling provided to the user at this time can be suppressed.

Next, with reference to a flowchart shown in FIG. 7, a flow to provide a click feeling to a user performing a touching operation will be described.

First, at the start of the flowchart in FIG. 7, it is assumed that the main power supply for the image forming apparatus 100 has been turned on, and a menu screen, a setting screen, or the like that requires an input through a touching operation is displayed on the operation panel 101 (liquid crystal display panel 12). Then, when a user touches the touch panel 13, the flowchart in FIG. 7 is started. It is noted that when a user touches the touch panel 13, a pressure is applied to the piezoelectric element 17, whereby the piezoelectric element 17 is displaced and a voltage is generated in the piezoelectric element 17.

In step S1, the panel control portion 130 acquires an output signal (a signal indicating the voltage value of the voltage generated in the piezoelectric element 17) from the voltage detection portion 132. In step S2, based on the output of the voltage detection portion 132, the panel control portion 130 detects the voltage value (the maximum value of amplitude) of the voltage generated in the piezoelectric element 17. At this time, if a plurality of piezoelectric elements 17 are provided on the touch panel 13, the panel control portion 130 detects all the voltage values of the voltages generated in the plurality of piezoelectric elements 17.

In step S3, the panel control portion 130 determines whether or not the detected voltage value is within a predetermined voltage range RS. As a result of the determination, if the detected voltage value is within the predetermined voltage range RS, the process proceeds to step S4. In step S4, the panel control portion 130 sets a voltage value (application voltage to the piezoelectric element 17) for vibrating the piezoelectric element 17, at a predetermined reference value. On the other hand, if the detected voltage value is not within the predetermined voltage range RS, the process proceeds to step S5.

In step S5, the panel control portion 130 determines whether or not the detected voltage value is below the predetermined voltage range RS. As a result of the determination, if the detected voltage value is below the predetermined voltage range RS, the process proceeds to step S6. On the other hand, if the detected voltage value is not below the predetermined voltage range RS, that is, if the detected voltage value is above the predetermined voltage range RS, the process proceeds to step S7.

Then, in step S6 subsequent to step S5, the panel control portion 130 sets the voltage value for vibrating the piezoelectric element 17 to a (predetermined) value larger than the reference value. On the other hand, in step S7 subsequent to step S5, the panel control portion 130 sets the voltage value for vibrating the piezoelectric element 17 to a (predetermined) value smaller than the reference value.

After step S4, step S6, or step S7, the process proceeds to step S8. In step S8, the panel control portion 130 instructs the drive portion 131 to apply the set voltage to the piezoelectric element 17, to vibrate the piezoelectric element 17 (touch panel 13). For example, the panel control portion 130 vibrates the piezoelectric element 17 until a predetermined time elapses. Alternatively, the operation panel 130 vibrates the piezoelectric element 17 until the touch on the touch panel 13 is released.

In step S9, the operation panel 101 determines whether or not the touch panel 13 has been newly touched, based on output from the touch panel 13. As a result of the determination, if the touch panel 13 has been newly touched, the process proceeds to step S1. If the touch panel 13 has not been newly touched, the process is ended.

In the operation panel 101 (display input device) of the present embodiment, when a user touches the touch panel 13, if vibration caused by the piezoelectric element 17 is well transmitted to a finger of the user, the vibration of the piezoelectric element 17 becomes small, and if vibration caused by the piezoelectric element 17 is less transmitted to a finger of the user, the vibration of the piezoelectric element 17 becomes large. As a result, variation in a click feeling (feeling of vibration caused by the piezoelectric element) provided to the user can be suppressed.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display input device comprising:
    a display portion including a touch panel that detects a touched position on a display surface;
    a plurality of piezoelectric elements that are provided on the touch panel and vibrate the touch panel;
    a drive portion that, in response to the touch panel being touched, applies a first voltage to each individual piezoelectric element of the plurality of piezoelectric elements to vibrate the piezoelectric elements; and
    a detection portion that detects a voltage value of a second voltage generated in one or more of the piezoelectric elements by a pressure being applied to the piezoelectric elements when the touch panel is touched,
    wherein, for each individual piezoelectric element of the plurality of piezoelectric elements, the drive portion adjusts the first voltage applied to the individual piezoelectric element, in accordance with the voltage value of the second voltage generated by the individual piezoelectric element such that a vibration within a predetermined range of vibrational displacement is generated whenever the touch panel is touched regardless of the position of the touch on the touch panel, where:
        the smaller the voltage value of the second voltage detected by the detection portion is, the larger the first voltage applied to the individual piezoelectric element by the drive portion for vibrating the individual piezoelectric element is,
        the larger the voltage value of the second voltage detected by the detection portion is, the smaller the first voltage applied to the individual piezoelectric element by the drive portion for vibrating the individual piezoelectric element is, and
        when the voltage value of the second voltage detected by the detection portion is below a predetermined voltage range, the drive portion increases the first voltage to be applied to the individual piezoelectric element to be larger than a predetermined reference value, and when the voltage value of the second voltage detected by the detection portion is above the predetermined voltage range, the drive portion decreases the first voltage to be applied to the individual piezoelectric element to be smaller than the predetermined reference value.

2. The display input device according to claim 1, wherein the drive portion adjusts the voltage to be applied to each individual piezoelectric element of the plurality of piezoelectric elements, based on the voltage value detected by the detection portion, every time the touch panel is touched.

3. An image forming apparatus comprising:
    a display portion including a touch panel that detects a touched position on a display surface;
    a plurality of piezoelectric elements that are provided on the touch panel and vibrate the touch panel;
    a drive portion that, in response to the touch panel being touched, applies a first voltage to each individual piezoelectric element of the plurality of piezoelectric elements to vibrate the piezoelectric element; and
    a detection portion that detects a voltage value of a second voltage generated in one or more of the plurality of piezoelectric elements by a pressure being applied to the piezoelectric element when the touch panel is touched,
    wherein, for each individual piezoelectric element of the plurality of piezoelectric elements, the drive portion adjusts the first voltage applied to the individual piezoelectric element, in accordance with the voltage value of the second voltage generated by the individual piezoelectric element such that a vibration within a predetermined range of vibrational displacement is generated whenever the touch panel is touched regardless of the position of the touch on the touch panel, where:
        the smaller the voltage value of the second voltage detected by the detection portion is, the larger the first voltage applied to the individual piezoelectric element by the drive portion for vibrating the individual piezoelectric element is, the larger the voltage value of the second voltage detected by the detection portion is, the smaller the first voltage applied to the individual piezoelectric element by the drive portion for vibrating the individual piezoelectric element is, and when the voltage value of the second voltage detected by the detection portion is below a predetermined voltage range, the drive portion increases the first voltage to be applied to the individual piezoelectric element, to be larger than a predetermined reference value, and when the voltage value of the second voltage detected by the detection portion is above the predetermined voltage range, the drive portion decreases the first voltage to be applied to the individual piezoelectric element, to be smaller than the predetermined reference value.

4. The image forming apparatus according to claim 3, wherein the drive portion adjusts the voltage to be applied to each individual piezoelectric element of the plurality of piezoelectric elements, based on the voltage value detected by the detection portion, every time the touch panel is touched.

* * * * *